United States Patent [19]

Lopez

[11] Patent Number: 4,497,148
[45] Date of Patent: Feb. 5, 1985

[54] PANEL CONNECTOR SYSTEM
[75] Inventor: José A. Lopez, Miami, Fla.
[73] Assignee: Camilo Muebles, Inc., Coral Gables, Fla.
[21] Appl. No.: 360,558
[22] Filed: Mar. 22, 1982
[51] Int. Cl.³ .............................................. E04B 2/76
[52] U.S. Cl. ..................................... 52/126.3; 52/239; 52/584
[58] Field of Search ................... 52/36, 38, 281, 282, 52/582, 584, 239, 243, 731, 126.3, 238, 471, 239, 762, 241, 464, 465; 248/243, 297.2, 244, 245

[56] References Cited

U.S. PATENT DOCUMENTS

| | | |
|---|---|---|
| 1,836,723 | 6/1932 | Levene . |
| 2,202,861 | 6/1940 | Mills ................................... 52/282 |
| 2,962,133 | 11/1960 | Kivett et al. ...................... 52/584 X |
| 3,152,672 | 10/1964 | Oppenhuizen ...................... 52/731 |
| 3,167,609 | 1/1965 | Brann ................................. 248/243 |
| 3,194,361 | 7/1965 | Thurman . |
| 3,207,322 | 9/1965 | Pedersen .......................... 52/243 X |
| 3,265,416 | 8/1966 | Downes .............................. 52/242 |
| 3,276,175 | 10/1966 | Birum, Jr. . |
| 3,312,021 | 4/1967 | Rolland ............................ 52/126.3 |
| 3,320,707 | 5/1967 | Berg . |
| 3,359,022 | 12/1967 | Russell . |
| 3,378,977 | 4/1968 | Vervloet ............................. 52/584 |
| 3,425,171 | 2/1969 | Propst et al. . |
| 3,430,997 | 3/1969 | Propst et al. . |
| 3,449,877 | 6/1969 | Beckman . |
| 3,453,790 | 7/1969 | Harris . |
| 3,517,467 | 6/1970 | Propst et al. . |
| 3,566,561 | 3/1971 | Tozer ................................. 52/282 |
| 3,868,800 | 5/1975 | Peterson . |
| 3,892,189 | 7/1975 | Killam ............................. 52/36 X |
| 3,990,204 | 11/1976 | Haworth et al. . |
| 4,269,005 | 5/1981 | Timmons . |

FOREIGN PATENT DOCUMENTS 2436226  5/1980  France ................................. 52/584

Primary Examiner—John E. Murtagh
Attorney, Agent, or Firm—Roylance, Abrams, Berdo & Goodman

[57] ABSTRACT

A panel connector system comprises two opposed elongated channels mounted on adjacent portions of two panels to be connected, and fittings and fasteners for securing the channels together. Each channel has a base, end flanges at the opposite ends of the base and a central tenon. The fittings are coupled by the fasteners and engage the central tenons to couple the channels. A plurality of pairs of fittings having lengths significantly less than that of the channels and spaced along the length of the channels can be employed to connect the channels. Additionally, slots can be formed in the channels between the central tenons and end flanges for receiving concealing strips which cover the fittings and fasteners. Adjustable support members and brackets for supporting shelves or cabinets on the panels can also be secured to the channels.

17 Claims, 11 Drawing Figures

PANEL CONNECTOR SYSTEM

FIELD OF THE INVENTION

The present invention relates to a system for connecting panels in which adjacent panels are connected by elongated channels fixed to the panels and fittings coupling the channels. The panels, can be, for example, of the type employed as decorative room dividers.

BACKGROUND OF THE INVENTION

In constructing and designing a system for connecting panels, the prime considerations are expense and complexity of manufacture and assembly, adaptability to a wide variety of uses, strength of the connection and aesthetic properties of the final construction. The expense and complexity must be minimized, while the other considerations must be maximized in the system in order for the system to be successful.

While various channel connector systems have been known in this art, they have tended to be expensive and difficult to manufacture and assemble, unadaptable to a wide variety of uses, weak and/or not sufficiently pleasing in appearance. Typical conventional connector systems are disclosed in U.S. Pat. Nos. 2,962,133 to Kivett et al, 3,425,171 to Propst et al, 3,430,997 to Propst et al, 3,517,467 to Propst et al, 3,990,204 to Haworth et al, 3,449,877 to Beckman, and 3,868,800 to Peterson.

For example, the system of the Kivett et al patent employs channels having a central dovetail tenon and coextensive dovetail fittings which are forced together by a threaded fastener to lock the channels and thereby the adjacent panels to one another. Since the fittings have a length which is coextensive with that of the channels and since the fittings extend across the entire width of the channels, this arrangement is expensive to manufacture, difficult to manipulate during assembly and is not readily adaptable to permit the attachment of accessories to the channels.

SUMMARY OF THE INVENTION

Accordingly, a primary object of the present invention is to provide a system for connecting panels which is simple and inexpensive to manufacture and assemble.

Another object of the present invention is to provide a system for connecting panels which provides a rigid, strong and aesthetic connection.

A further object of the present invention is to provide a system for connecting panels which may be adapted to a wide variety of uses including the attachment of accessory items.

The foregoing objects are basically obtained by a panel connector system comprising first and second elongated channels with means for attaching the channels to adjacent portions of adjacent panels, and first and second pairs of fittings for connecting the channels together. Each channel includes a base, first and second end flanges which extend from opposite ends of the base and a central tenon extending from the base in the same direction as the end flanges. The first channel faces the second channel such that the first channel end flanges and central tenon are aligned with an extend toward the second channel end flanges and central tenon. The fittings of each pair have a length which is significantly less than that of the channels, are coupled by fasteners and connect the central tenons of the two channels. Each fitting is generally T-shaped in transverse cross section with a center post extending between the central tenons and laterally extending arms engaging the central tenons. The first pair of fittings is spaced along the spaced along the length of the channels from the second pair of fittings.

The foregoing objects are also basically obtained by providing a panel connector system comprising first and second channels, first and second fittings coupling the channels and first and second concealing strips received between the two channels. The channels have mounting means for attaching the channels to adjacent portions of adjacent panels. Each channel includes a base, first and second end flanges extending from opposite ends of the base, a central tenon extending from the base in the same direction as the end flanges and first and second slots in the base with the first slot between the first end flange and the central tenon and the second slot between the second end flange and the tenon. The first channel faces the second channel such that the first channel end flanges, central tenon and slots are aligned with and extend toward the second channel end flanges, central tenon and slots. The fittings are coupled by fasteners and connect the central tenons of the two channels. The concealing strips are received in the respective slots so as to cover the fittings and fasteners.

By forming the panel connector system in this manner, the component parts thereof can be simply and inexpensively manufactured and assembled to connect panels. The resulting connection of the panels is strong and permits adaption to a wide variety of uses including the attachment of accessory devices, such as shelves and cabinets. The use of two pairs of relatively short fittings is less expensive and easier to manipulate then fittings which are formed of a length coextensive with that of the channels. The short fitting pairs permit the fittings to be manufactured and stored as single standardized items with the number used for each connection varying with the length of the channels and the strength requirement of the particular use. This eliminates the need to customize the fittings for each channel size.

The slots in the channel bases receiving concealing strips facilitates assembly and enhances the appearance of the system. Since the concealing strips are mounted to the channels at locations spaced from the end flanges thereof, the end flanges are exposed permitting their use for attaching accessory items such as shelves, cabinets, etc.

The fittings can be formed such that they are laterally spaced inwardly from the end flanges providing a space between the fittings and the end flanges. This arrangement facilitates the use of the end flanges for attaching accessory items.

Support members can depend from and be adjustably coupled to the channels support the panels above a support surface. This support member can be U shaped having two legs with upper portions received between the end flanges. These upper portions can be coupled by fasteners which force the upper portions into frictional engagement with the channels. This arrangement for the support member facilitates mounting of the support members to the channel, provides an inexpensive way of providing a support member, and permits the panels to be easily adjusted in a vertical direction relative to a floor.

Accessory items can be attached to the channels by an attachment arrangement comprising a nut member, a bracket and a threaded fastener. The nut member abuts inner surfaces of one pair of adjacent end flanges and abuts the base member to prevent rotation of the nut member relative to the channels. The bracket has a vertical member which overlies outer surfaces of the end flanges and has a bore therethrough which receives the threaded fastener. One end of the threaded fastener is engaged in the nut member forcing the nut member and vertical member into frictional engagement with the end flanges. This frictional engagement permits the bracket to be located in any desired vertical position along the length of the channel in a simple and inexpensive manner.

Other objects, advantages and salient features of the present invention will become apparent from the following detailed description which taken in conjunction with the annexed drawings, discloses a preferred embodiment of the present invention.

BRIEF DESCRIPTION OF THE DRAWINGS

Referring to the drawings which form a part of this original disclosure.

DETAILED DESCRIPTION OF THE PREFERRED EMBODIMENT OF THE INVENTION

Figure 1:
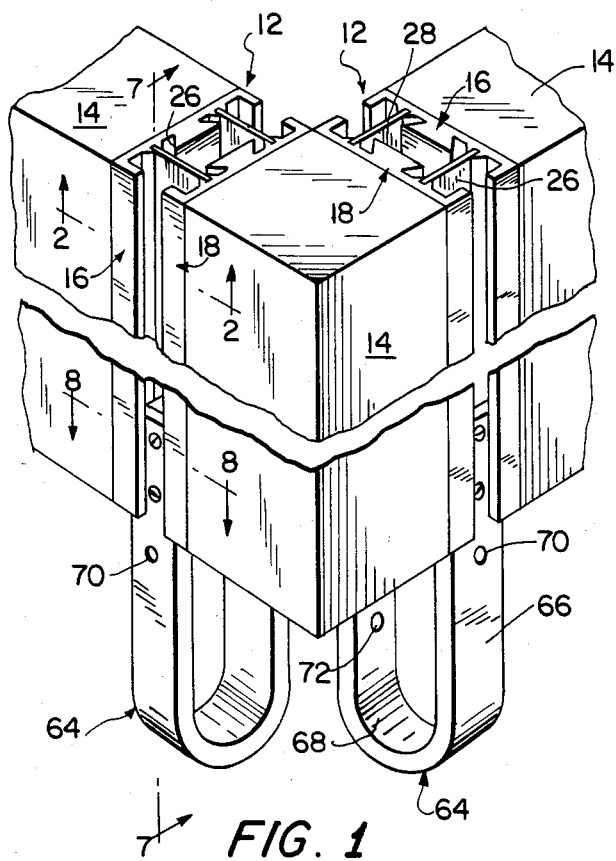
FIG. 1 is a partial, perspective view of a panel connector system in accordance with the present invention.
Figure 3:
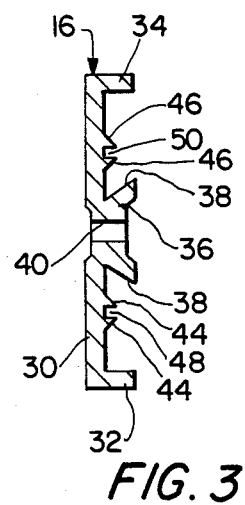
FIG. 3 is a top plan view in cross section of a channel of the system of FIG. 1.

Referring initially to FIGS. 1–6, the present invention relates to a system 12 for connecting panels 14. These panels can be formed of any suitable material, such as wood, plastic or a frame covered with cloth, and can be formed of any desired size. Although the system is illustrated as connecting adjacent vertical side edges of adjacent panels, it will be readily recognized by those skilled in this art that the system can be employed to connect panels in a horizontal plane or to connect a side edge with a front face of a panel.

The basic components of the system comprise first and second channels 16, 18, fittings 20, 22, threaded fasteners 24 for the fittings, and first and second concealing strips or decorative strips 26, 28. When assembled, the fittings are coupled by the fasteners to connect the channels, thereby connecting the panels to which the channels are connected. The concealing strips are coupled to the channels and cover the fittings.

The two elongated channels 16, 18 of system 12 have a substantially constant cross-sectional configuration along their entire length and are identical in shape. Thus, only one such channel will be described in detail, with particular to reference being made to FIGS. 3 and 6. The channel includes a base 30 which cvomprises a plate-like member terminating at the opposite ends thereof in first and second end flanges 32, 34. The end flanges extend perpendicularly from the base in the same direction. A central dovetail tenon 36 extends from the inner surface of base 30 and is equally spaced between end flanges 34, 32. Tenon 36 has angled, i.e., tapered, surfaces 38 facing in the general direction of end flanges 32, 34. At various locations along the length of tenon 36, bores 40 extend entirely through the channel to receive screws 42 for securing the channel to a panel.

Two pairs of elongated projections 44, 46 extend from base 30 in the same direction as and parallel to end flanges 32, 34 and tenon 36. The first pair of projections 44 define a first elongated slot 48, while the second pair of projections 46 define a second elongated slot 50. In this manner, first slot 48 is generally centrally located between first end flange 32 and tenon 36 and second slot 50 is generally centrally located between second end flange 34 and tenon 36. The slots have substantially rectangular cross sections. Projections 44, 46 are removed from the bottom three inches of each channel, e.g., by milling, such that the inner surfaces between flanges 32, 34 and tenon 36 are planar at the bottom portion of each channel.

Figure 4:
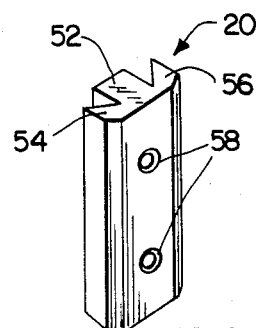
FIGS. 4 and 5 are perspective views of the two fittings of the system of FIG. 1.
Figure 5:
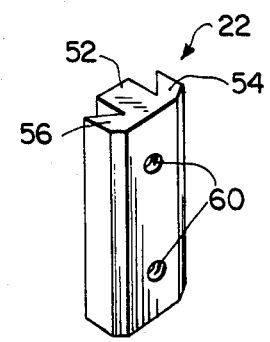
Figure 6:
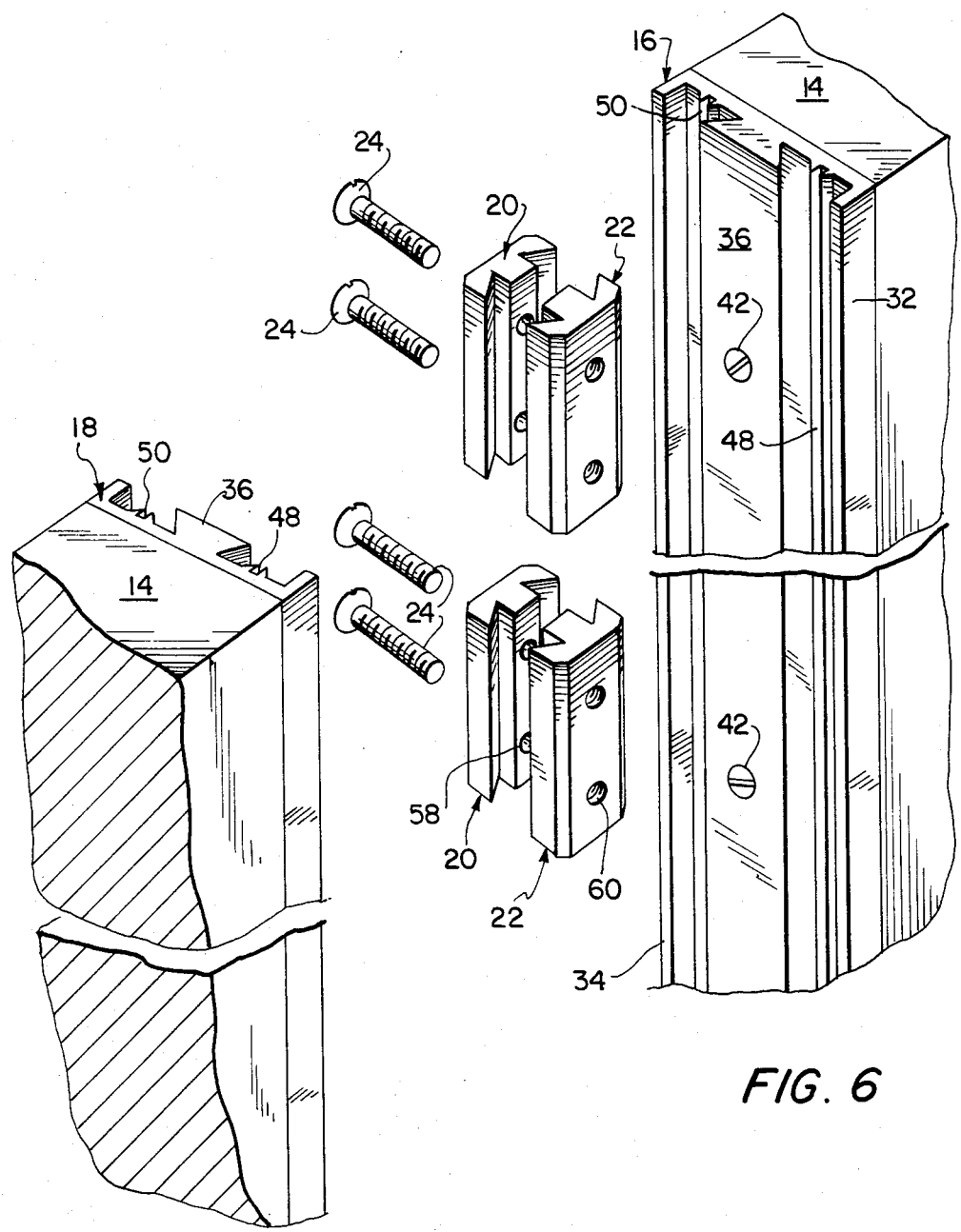
FIG. 6 is a partial, exploded perspective view of the system of FIG. 1 with portions omitted for clarity.

As illustrated in FIGS. 4–6, each pair of fittings comprises two similar fittings differing only in the type of bores formed therein. Since each pair of fittings is identical, only one pair will be described in detail.

Each fitting 20, 22 is generally T-shaped with a center post 52 and acutely angled arms 54, 56 extending from one end of the post such that an acute angle is defined between the arms. The angle of the arms conforms to angled surfaces 38 of channel tenon 36 to form a dovetail connection between the tenons and the fittings. Fitting 20 is provided with countersunk through-bores 58, while fitting 22 is provided with internally threaded throughbores 60. The fittings have a length significantly less than one-half that of the channels.

Concealing strips 26, 28 comprise elongated strip-like members having substantially rectangular cross sections and formed of suitable material, such as metal or plastic. These strips may have a decorative outer surface. In FIG. 6, strips 26, 28 have been omitted for clarity.

Figure 2:
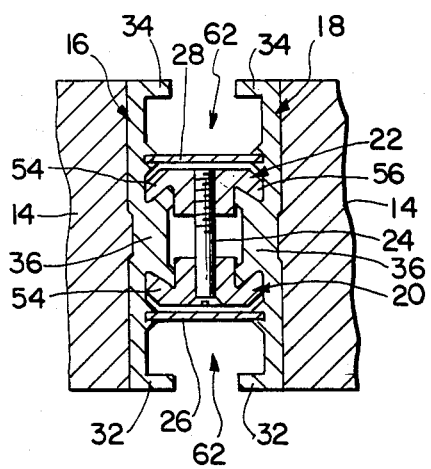
FIG. 2 is a bottom plan view in cross section taken along lines 2—2 in FIG. 1.

In assembling the system, channels 16, 18 are secured to adjacent edges of adjacent panels 14 which are to be coupled by passing screws 42 through bores 40 and securing the screws in a suitable manner to panels 14. The panels with the channels fixed thereto are then approximately located as illustrated in FIGS. 1 and 2 such that first channel 16 is spaced from but faces and opposes second channel 18 in an aligned manner. In this aligned manner, the first end flanges 32, the second end flanges 34, the central tenons 36, the first slots 48 and the second slots 50 are directly opposed, aligned and extend toward each other with space therebetween.

Once the channels and panels have been located in the approximate position of FIG. 2, the desired number of pairs of fittings are slid between the panels to securely couple them. The number and relative location of the pairs of fittings varies depending on the size of the panels being interconnected and the strength of the connection necessary for the particular use of the panel connector system. Each pair of fittings is slid into the channel such that arms 54 engage tenon 36 of channel 16 while arms 56 engage tenon 36 of channel 18. Screws 24 pass through bores 58 in fittings 20 and are threadedly engaged in bores 60 of fittings 54. As the screw is threaded to draw fittings 20, 22 toward each other, the inner surfaces of the fitting arms slide on angled surfaces 38 of tenons 36 to accurately position and secure channels 16, 18 relative to each other. Additionally, center posts 52 extend between and contact the inner surfaces of tenons 36.

After the desired number of fitting pairs have been located within and secured to the channels, concealing strips 26, 28 are slid into slots 48, 50 respectively. In this manner, the concealing strips cover the fittings to eliminate lateral through-passageways between the channels and to provide a decorative finish for the system.

The fittings are shaped and dimensioned such that they are entirely located between central tenons 36 and the projections defining slots 48, 50. This permits concealing strips 26, 28 to be located within channel 16, 18 and still completely cover the fittings and fasteners therein. Additionally, this arrangement laterally spaces the fittings inwardly from end flanges 32, 34 providing an elongated space 62 therebetween as seen in FIG. 2. Spaces 62 are defined between the end flanges and the adjacent concealing strips and are laterally exposed through the gap between the opposed end flanges of the channels.

Figure 7:
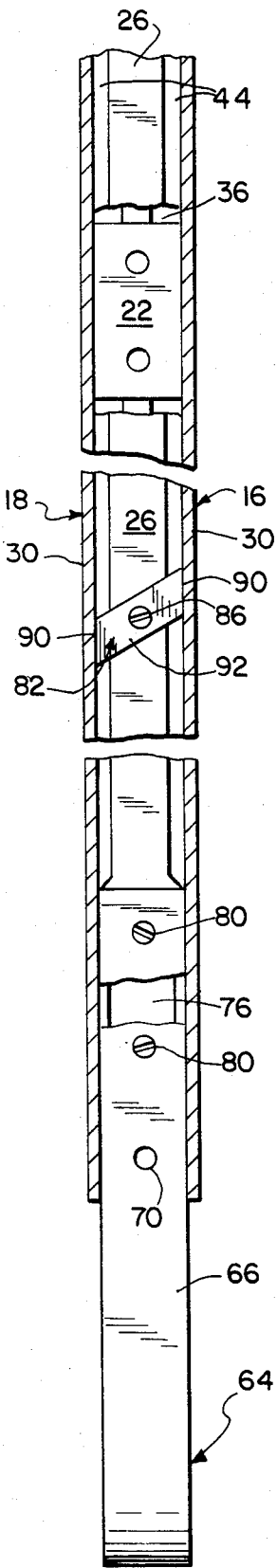
FIG. 7 is a side elevational view in section taken along lines 7—7 of FIG. 1.
Figure 8:
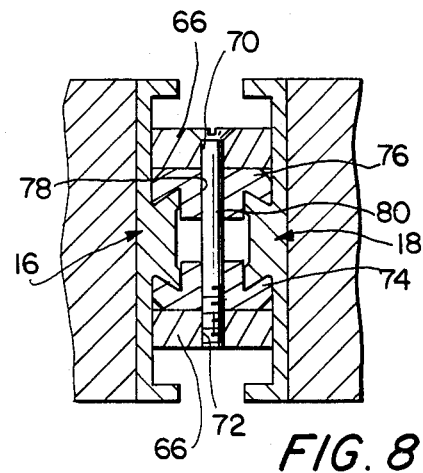
FIG. 8 is a top plan view in section taken along lines 8—8 of FIG. 1.

Each panel connector system 12 can be provided with a support member 64 which depends from and is adjustably coupled to channels 16, 18 between the end flanges. Referring to FIGS. 1, 7 and 8, the support member is generally U-shaped having two upwardly extending legs 66 connected at their lower ends by a bight 68. Support member 64 is generally rectangular in cross section. The upper portions of legs 66 have three pairs of aligned bores. The bores 70 in one leg are countersunk, while the bores 72 in the other leg are internally threaded.

A pair of fittings 74, 76 are used in mounting support member 64 in the channels. These fittings are similar to fittings 20, 22 except that they are formed with a pair of straight through bores 78. Threaded fasteners 80 extend through countersunk bores 70 in one leg 66, through bores 78 in fittings 74, 76 and between central tenons 36 of the channels, and are threaded in bores 72 in the other support member leg. Concealing strips 26, 28 can terminate short of support member 64 to avoid interference therewith.

In assembling the support member, the upper portions of legs 66 are slid into spaces 62 between the elongated channels and fittings 66, 68 are coupled to channel tenons 36 such that the pairs of bores in the fittings are aligned with two adjacent pairs of bores in legs 66. The selection of the pairs of bores as well as the location of the fittings and legs within the channels can be employed to adjustably position the legs, thereby adjusting the position of the panels above a support surface such as a floor. Once support member 64 is in a desired degree of extension from the channels, fasteners 80 are tightened such that the leg upper portions are drawn toward one another forcing fittings 74, 76 into frictional engagement with central tenons 36 of the channels, thereby locking support member 64 in place and coupling the bottom portions of the channels. Since projections 44, 46 have been removed from the channels adjacent the connection of the support member, the projections do not interfere with the support member to channel connection.

Suitable attachments such as shelves and cabinets can be mounted on the panels by attaching them to channels 16, 18. Referring now to FIGS. 7 and 9-11, the attachment supporting mechanism comprises a nut member 82, a bracket 84 and a threaded fastener 86.

Nut member 82 comprises a generally plate-like piece having an internally threaded bore 88 centrally located therein and an outer configuration in the form of a parallelogram with nonperpendicular included again. As illustrated in FIG. 7, the ends 90 abut channel base members 30 such that the nut member is acutely angled relative to first end flanges 32 and base members 30 and cannot rotate relative to channels 16, 18. The outer face 92 overlies and abuts the inner surfaces of channel first end flanges 32.

Bracket 84 is L-shaped having a vertical member 94 and a horizontal member 96. Horizontal member 94 has a bore 98 centrally located therein.

Figure 9:
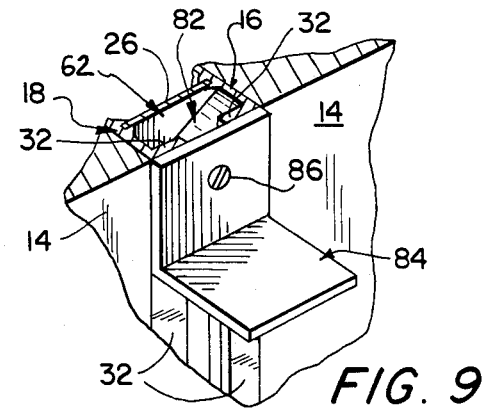
FIG. 9 is a partial, perspective view of the system of FIG. 1 with an attachment coupled thereto.
Figure 10:
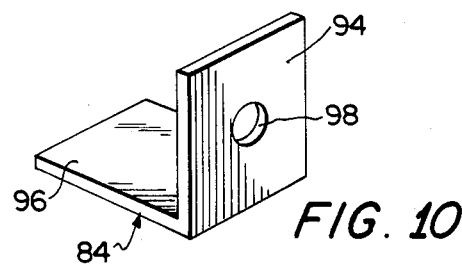
FIG. 10 is a perspective view illustrating the bracket of FIG. 9.
Figure 11:
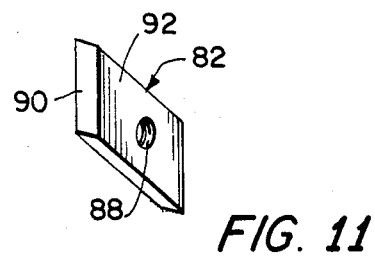
FIG. 11 is a prospective view of the nut member of the attachment of FIG. 9.

In mounting bracket 84 the surface of vertical member 94 remote from horizontal member 96 overlies the outer surfaces of channel first end flanges 32, as illustrated in FIG. 9, such that bore 88 is nut member 82 and bore 98 in the bracket are aligned. Fastener 96 passes through bore 98, through the gap between the first end flanges and is threadedly engaged within bore 88. The threading of fastener 86 within threaded bore 88 forces nut member 82 and bracket vertical member 94 into frictional engagement with the inner and outer surfaces, respectively, of channel first end flanges 32 to secure bracket 82 in place. In this manner, bracket 84 can be located in any desired longitudinal position along the channels. Once the bracket has been secured in a desired position on the channels, a device can be mounted thereon so that it is attached to and extends from the panels. Bracket 84 may take any suitable form depending on the type of device to be supported on the panels.

While a particular embodiment has been chosen to illustrate the invention, it will be understood by those skilled in this art that various changes and modifications can be made therein without the departing from the scope of the invention has defined in the appended claims.

What is claimed is:

1. A panel connector system for coupling a pair of adjacent panels, comprising:
   first and second elongated channels having mounting means for attaching said channels to adjacent portions of adjacent panels, said channels extending substantially the entire height of the panels, each said channel including
   a base,
   first and second end flanges extending from opposite ends of said base, and
   a central tenon extending from said base in the same direction as said end flanges,
   said first channel being spaced from and facing said second channel such that said end flanges and central tenon of said first channel are aligned with and extend toward said end flanges and central tenon of said second channel;
   first and second pairs of fittings, said fittings of each pair having a length significantly less than that of said channels, being coupled by fasteners and connecting said central tenons, each said fitting being generally T-shaped in transverse cross section with a center post extending between said central tenons and laterally extending arms engaging said central tenons, said first pair being spaced from said second pair along the length of said channels, said fitting having outwardly facing surfaces laterally spaced inwardly from said end flanges providing spaces between said end flanges and said outwardly facing surfaces; and a support member depending from and adjustably coupled to said channels between said end flanges thereof;

whereby said end flanges are accessible and unobstructed for coupling accessory structures.

2. A panel connector system according to claim 1, wherein each said channel includes first and second slots in said base with said first slot between said first end flange and said central tenon thereof and said second slot between said second end flange and said central tenon thereof; and wherein first and second concealing strips are received in said first slots and said second slots, respectively, covering said fittings and fasteners.

3. A panel connector system according to claim 1, wherein said fittings and said central tenons form a dovetail connection.

4. A panel connector system according to claim 1, wherein said support member is U-shaped comprising two upwardly extending legs with upper portions received between said end flanges.

5. A panel connector system according to claim 4, wherein said leg upper portions are coupled to said second pair of fittings by said fasteners thereof drawing said upper portions toward one another and forcing said second pair of fittings into frictional engagement with said central tenons of said channels at various locations along the length of said channels.

6. A panel connector system according to claim 1, wherein attachment means for supporting a device an outer surfaces of said channels is adjustably coupled to said channels permiting height adjustment thereof, said attachment means comprising a nut member abutting inner surfaces of said first end flanges and abutting said base member to prevent rotation of said nut member relative to said channels, a bracket having a vertical member overlying outer surfaces of said first end flanges and having a bore therethrough, and a threaded fastener extending through said bracket bore and treadedly engaging said nut member forcing said nut member and said vertical member into frictional engagement with said first end flanges.

7. A panel connector system according to claim 6, wherein said nut member is acutely angled relative to said first end flanges.

8. A panel connector system according to claim 6, wherein said center posts engage inner surfaces at said central tenons.

9. A panel connector system according to claim 1 wherein said fittings have a length significantly less than one-half that of said channels.

10. A panel connector system, comprising:

first and second elongated channels having mounting means for attaching said channels to adjacent portions of adjacent panels, each said channel including a base, first and second end flanges extending from opposite ends of said base, a central tenon extending from said base in the same direction as and between said end flanges, and first and second slots in said base with said first slot between said first end flange and said central tenon and said second slot between said second end flange and said central tenon, said first channel facing and being spaced from said second channel such that said end flanges, central tenon and slots of said first channel are aligned with and extend toward said end flanges, central tenon and slots of said second channel;

first and second fittings coupled by fasteners connecting said central tenons;

first and second concealing strips received in said first slots and said second slots, respectively, covering said fittings and fasteners, said concealing strips and slots therefor being laterally spaced inwardly from said end flanges providing spaces between said end flanges and said concealing strips; and a support member depending from and adjustably coupled to said channels between said end flanges thereof;

whereby said end flanges are accessible and unobstructed for coupling accessory structures.

11. A panel connector system according to claim 10 wherein said fittings have a length significantly less than that of said channels.

12. A panel connector system according to claim 10 wherein said fittings have a length significantly less than one-half that of said channels.

13. A panel connector system, comprising:

first and second elongated channels having mounting means for attaching said channels to adjacent portions of adjacent panels, each said channel including a base, first and second end flanges extending from opposite ends of said base, and a central tenon extending from said base in the same direction as said end flanges, said first channel being spaced from and facing said second channel such that said end flanges and central tenon of said first channel are aligned with and extend toward said end flanges and central tenon of said second channel;

a first pair of fittings, said fittings being coupled by fasteners and connecting said central tenons, each said fitting being generally T-shaped in transverse cross section with a center post extending between said central tenons and laterally extending arms engaging said central tenons, said fittings having outwardly facing surfaces laterally spaced inwardly from said end flanges providing a space therebetween; and a support member depending from and adjustably coupled to said channels between said end flanges thereof;

whereby said end flanges are accessible and unobstructed for coupling accessory structures.

14. A panel connector system according to claim 10, wherein said support member is U-shaped comprising two upwardly extending legs with upper portions received between said end flanges.

15. A panel connector system according to claim 14, wherein said leg upper portions are coupled to said second pair of fittings by said fasteners thereof drawing said upper portions toward one another and forcing said second pair of fittings into frictional engagement with said central tenons of said channels at various locations along the length of said channels.

16. A panel connector system according to claim 13, wherein said support member is U-shaped comprising two upwardly extending legs with upper portions received between said end flanges.

17. A panel connector system according to claim 16, wherein said leg upper portions are coupled to said first pair of fittings by said fasteners thereof drawing said upper portions toward one another and forcing said first pair of fittings into frictional engagement with said central tenons of said channels at various locations along the length of said channels.

* * * * *